United States Patent
Srinivasan et al.

(10) Patent No.: US 8,223,936 B2
(45) Date of Patent: Jul. 17, 2012

(54) METHOD AND SYSTEM FOR PROVIDING PAY-PER-CALL SERVICES

(76) Inventors: Thirunarayanan Srinivasan, Highlands Ranch, CO (US); Ramesh Ramamurthy, Highlands Ranch, CO (US); Krishnan Kannan, Highlands Ranch, CO (US); Muralidharan Anakavur, Highlands Ranch, CO (US); Gopakumar Padmanabhan, Highlands Ranch, CO (US)

(*) Notice: Subject to any disclaimer, the term of this patent is extended or adjusted under 35 U.S.C. 154(b) by 1059 days.

(21) Appl. No.: 11/627,150

(22) Filed: Jan. 25, 2007

(65) Prior Publication Data
US 2008/0086384 A1    Apr. 10, 2008

Related U.S. Application Data

(60) Provisional application No. 60/828,744, filed on Oct. 9, 2006.

(51) Int. Cl.
*H04M 15/00* (2006.01)
*G06Q 30/00* (2006.01)
*G06Q 10/00* (2006.01)
*H06M 3/42* (2006.01)

(52) U.S. Cl. .......... 379/114.13; 379/114.05; 705/14.53; 705/14.69; 705/14.73

(58) Field of Classification Search .............. 379/114.01, 379/114.05, 114.13, 121.01; 705/14.4, 14.49, 705/14.51, 14.53, 14.54, 14.55, 14.57, 14.6, 705/14.66, 14.67, 14.69, 14.73
See application file for complete search history.

(56) References Cited

U.S. PATENT DOCUMENTS

| | | | |
|---|---|---|---|
| 7,120,235 B2 | 10/2006 | Altberg et al. | |
| 7,136,473 B2 | 11/2006 | Gruchala et al. | |
| 7,167,553 B2 | 1/2007 | Shaffer et al. | |
| 7,177,414 B1 | 2/2007 | Khan | |
| 2002/0152134 A1* | 10/2002 | McGlinn | 705/26 |
| 2003/0014331 A1* | 1/2003 | Simons | 705/27 |
| 2004/0103075 A1* | 5/2004 | Kim et al. | 707/1 |
| 2004/0234064 A1* | 11/2004 | Melideo | 379/265.09 |
| 2006/0015722 A1* | 1/2006 | Rowan et al. | 713/166 |
| 2006/0074760 A1* | 4/2006 | Helin et al. | 705/26 |
| 2006/0168225 A1* | 7/2006 | Gunning et al. | 709/226 |
| 2006/0253434 A1* | 11/2006 | Beriker et al. | 707/3 |
| 2007/0112656 A1* | 5/2007 | Howe et al. | 705/35 |
| 2008/0086384 A1* | 4/2008 | Srinivasan et al. | 705/26 |
| 2010/0076837 A1* | 3/2010 | Hayes et al. | 705/14.41 |

* cited by examiner

*Primary Examiner* — Binh K Tieu (57) ABSTRACT

A method and system are provided for connecting consumers and merchants. In accordance with one or more embodiments, the method includes (a) providing data on a plurality of merchants and one or more telephone numbers associated with each of the plurality of merchants; (b) receiving from a search system search data relating to an online search performed by a consumer directed at identifying a desired merchant, the search data identifying one or more merchants of the plurality of merchants matching the online search and a search association identifier associated with the consumer; (c) receiving the search association identifier from the consumer and facilitating communication between the consumer and a selected merchant of the one or more merchants; (d) associating the communication between the consumer and the selected merchant to the online search by matching the search association identifier received from the consumer and the search association identifier of the search data; and (e) charging the selected merchant a fee for connecting the consumer to the selected merchant when the communication between the consumer and the selected merchant is associated with the online search and the communication occurs within a predetermined period of time after the online search is performed by the consumer.

30 Claims, 5 Drawing Sheets

METHOD AND SYSTEM FOR PROVIDING PAY-PER-CALL SERVICES

RELATED APPLICATION

The present application is based on and claims priority from U.S. Provisional Patent Application No. 60/828,744 filed on Oct. 9, 2006 and entitled "Pay-Per-Call System and Method Using Advanced Intelligent Network," which is incorporated herein by reference in its entirety.

BACKGROUND OF THE INVENTION

The present application relates generally to the field of search marketing services and, more particularly, to methods and systems for providing search marketing services such as pay-per-call services for connecting consumers and merchants.

Pay-per-call is an advertising scheme used by websites, search engines, advertising networks, and the like, for providing marketing services. Merchants subscribe to service providers for the search marketing services. The merchants provide information about their businesses and one or more search terms to the service providers to enable searching through a service provider's search interfaces. Examples of service providers include, but are not limited to, search engines, telecom service providers, vertical search websites, newspapers online websites, and the like. The service providers may provide the search marketing services using, e.g., Internet, existing telecommunication networks, intranets, local area networks (LAN), metropolitan area networks (MAN), wide area networks (WAN), and the like.

Existing solutions for providing search marketing services include pay-per-call solutions, click-to-call solutions, and pay-per-click solutions. The pay-per-call solutions involve signing up merchants and assigning toll-free or local tracking phone numbers corresponding to the pre-existing telephone numbers of the merchants, for enabling communication between a consumer and the merchants. In particular, each search service provider advertising business of the merchant may provide a different toll free or local tracking number corresponding to the pre-existing telephone number associated with the merchant's business. This enables service providers to track and charge the merchant for the communication between the consumer and the merchant.

The click-to-call solutions include Personal Computer (PC)-based click to call and Mobile-based click-to-call solutions. The PC-based click-to-call solutions allow a consumer to provide a callback number, and a service provider such as, e.g., Google, connects the consumer and the selected merchant without typically disclosing the identity of the consumer. The click-to-call solutions may also allow the consumer to click on an icon on the search results page to call the merchant by downloading a Java plug-in and allowing the consumer to click an icon with the search results and call the merchant directly using Instant Messaging. The Mobile-based click-to-call solutions include enabling searching using a mobile phone. A communication between the consumer and the merchants may be established by clicking on an icon displayed in the search results on the mobile phone.

The toll free or local tracking numbers generally have to be used within a predefined time period, e.g., 24 hours, after which the number becomes invalid and consumers may get connected to a completely different merchant who may have been assigned same virtual toll free number. The pre-existing telephone number associated with the merchant is generally not displayed in the search results to enable tracking of the communication between the consumers and the merchants for billing purposes.

BRIEF SUMMARY OF EMBODIMENTS OF THE INVENTION

A method and system are provided for connecting consumers and merchants. In accordance with one or more embodiments, the method includes the steps of (a) providing data on a plurality of merchants and one or more telephone numbers associated with each of the plurality of merchants; (b) receiving from a search system search data relating to an online search performed by a consumer directed at identifying a desired merchant, the search data identifying one or more merchants of the plurality of merchants matching the online search and a search association identifier associated with the consumer; (c) receiving the search association identifier from the consumer and facilitating communication between the consumer and a selected merchant of the one or more merchants; (d) associating the communication between the consumer and the selected merchant to the online search by matching the search association identifier received from the consumer and the search association identifier of the search data; and (e) charging the selected merchant a fee for connecting the consumer to the selected merchant when the communication between the consumer and the selected merchant is associated with the online search and the communication occurs within a predetermined period of time after the online search is performed by the consumer.

In accordance with one of more embodiments, a method is provided of processing an online search query made by a consumer directed at identifying a desired merchant. The method features the steps of (a) storing data on a plurality of merchants and one or more telephone numbers associated with each of the plurality of merchants; (b) receiving an online search query from a consumer, the online search query comprising one or more keywords directed at identifying one or more desired merchants; (c) identifying one or more merchants of the plurality of merchants matching the one or more keywords; (d) assigning a search association identifier with the online search query; (e) transmitting search results and the search association identifier to the consumer, the search results comprising an identification of the one or more merchants of the plurality of merchants and one or more existing telephone numbers associated with each of the one or more merchants; and (f) transmitting search data to one or more telecom service providers, the search data comprising the search results, the search association identifier of the online search query, and a timestamp of the online search; wherein when a communication is made between the consumer and a selected merchant identified in the search results, the communication is associated with the online search query by one of the one or more telecom service providers using the search association identifier within a given period of time after the search result is transmitted to the consumer, such that the selected merchant can be charged a fee for connecting the consumer to the selected merchant.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

Like reference numerals denote like elements in the drawings.

DESCRIPTION OF PREFERRED EMBODIMENTS

Various embodiments of the invention include methods and systems for providing search marketing services such as pay-per-call services. The system can provide an integrated online search platform that enables consumers to perform online searching and interact with one or more merchants. Examples of the merchants that can use the system include, but are not limited to, business merchants such as classified advertisers and retail merchants such as stores, realtors, plumbers, electricians, lawyers, car salesmen, and the like. The system allows generating revenues from local and main searches for sponsored and the organic search results. The system also enables service providers to track communications between the consumers and the merchants efficiently. Further, the system provides a controlled exchange of information between the search service providers and telecom service providers facilitating the online search and subsequent communications between the consumers and the merchants.

Figure 1:
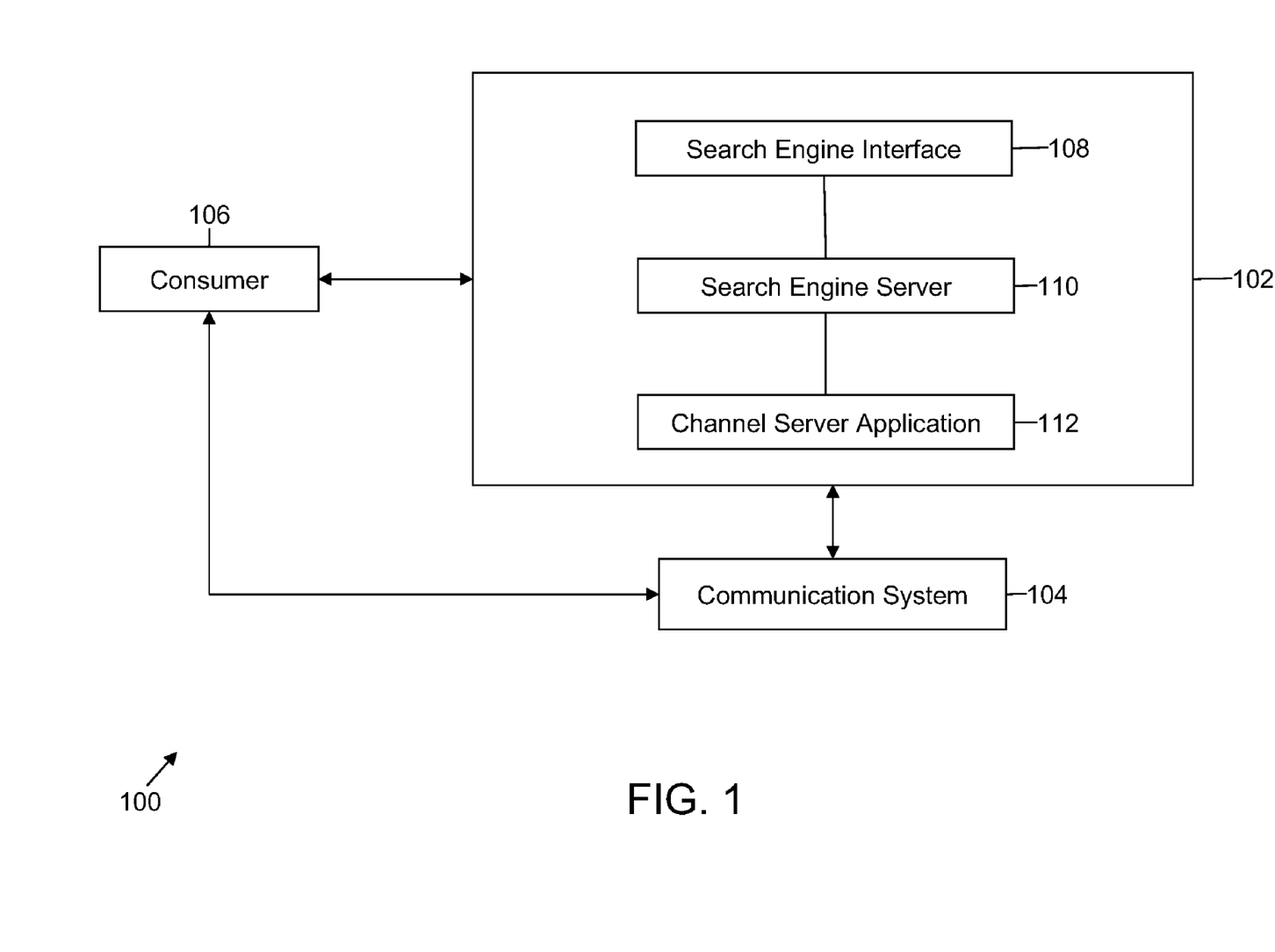
FIG. 1 is a block diagram of a system for providing search marketing services such as pay-per-call services in accordance with one or more embodiments of the invention.

FIG. 1 is a block diagram of a system 100 for providing search marketing services such as pay-per-call services, in accordance with one or more embodiments of the invention. System 100 includes a Search System 102 for processing an online search query and a Communication System 104 for connecting one or more consumers with one or more merchants identified during the online search. In accordance with one or more embodiments of the invention, system 100 describes a system that can be implemented by a search service provider such as Google, Yahoo!, and the like.

Search System 102 includes a Search Engine Interface 108, a Search Engine Server 110 and a Channel Server Application 112. Search System 102 receives a search query from a consumer such as a consumer 106, directed at identifying one or more desired merchants. Search system 102 processes the search query to provide details on the desired merchants to the consumer. Communication System 104 facilitates communication between consumer 106 and the desired merchants.

The search query entered by the consumer can contain one or more search terms for identifying the desired merchants. The search terms may include search keywords related to the business of the desired merchants. The consumer 106 preferably provides a geographical location of the desired merchants. Alternatively, a known geographical location of consumer 106 may be used to search for desired merchants. The consumer 106 enters the search query through a client device and by using Search Engine Interface 108. Examples of client devices may include, but are not limited to, a personal computer, a mobile phone, a Personal Digital Assistant (PDA), and the like. Examples of the Search Engine Interface 108 may include, but are not limited to, a webpage, a web browser interface, and the like. The Search System 102 may also provide consumer 106 with an option of performing different type of online searches such as a local search, a zip code search, a city search, a national search, and the like. The type of the online search may be based on, e.g., the geographical coverage desired by consumer 106.

The Channel Server Application 112 contains data on a plurality of merchants. The data on the merchants may be obtained from Communication System 104 preferably at periodic intervals, e.g., daily, weekly, and the like. The data on the merchants may also be obtained directly from merchants subscribing for the pay-per-call services with the search service provider. Accordingly, Search System 102 may also include a database for storing the data on the merchants. In particular, Channel Server Application 112 may include the database for storing the data on the merchants. The data on the merchants may include, e.g., Dialed Number Identification Service (DNIS) of the merchants, keywords describing business lines of the merchants, subscription categories of the merchants, business hours of the merchants, geographical locations of the merchants, and the like. In accordance with one or more embodiments of the invention, the telephone numbers associated with the merchants are the pre-existing telephone numbers of the merchants that are regularly used by the merchants for receiving calls from consumers. The existing telephone numbers may be, e.g., landline numbers, mobile numbers, toll-free telephone numbers, and the like. In accordance with one or more embodiments of the invention, Channel Server Application 112 may be a computer readable application and may be executed on a data processing device with the search service provider.

Search Engine Server 110 receives the search query from Search Engine Interface 108 and requests for data on the merchants from Channel Server Application 112. In accordance with one or more embodiments of the invention, Search Engine Server 110 may process the search query based on one or more predefined criteria and accordingly request for data on the merchants from Channel Server Application 112. For example, Search Engine Server 110 may request data on the merchants based on the geographical location entered by consumer 106. Channel Server Application 112 provides the data requested by Search Engine Server 110 in a predefined format. In accordance with one of more embodiments of the invention, Search Engine Server 110 may also collect the data on the merchants from one or more publicly available databases such as white pages, yellow pages, InfoUSA database, and the like.

Search Engine Server 110 identifies a list of merchants to be provided to consumer 106 by matching the online search query with the data on the merchants. The matching may be based on a first predefined criteria and may be performed using one or more data logics. The online search results are displayed to consumer 106 by using Search Engine Interface 108. The search results include the list of identified merchants, at least one phone number of each of the merchant in the list, and at least one search association identifier (SAI). Further, the information displayed to the consumer may include other information on the merchants such as the information on the products or services of the merchants, address information, website URLs, directions to the merchants' locations, and the like.

The search results may also further include information such as business hours of the merchants in the list, areas of coverage of the merchants in the list, and the like. In accordance with one or more embodiments of the invention, the search results may also include hyperlinks to, e.g., the website of the merchants. In particular, the hyperlinks may be used to communicate with the merchants.

Consumer 106 selects one or more merchants from the list. The information provided in the search results is used by consumer 106 to initiate a communication with the selected merchants. Communication System 104 facilitates the communication between consumer 106 and the selected merchants. In accordance with one of more embodiments of the invention, Communication System 104 is a telephone network operated by a telecom service provider. In particular, Communication System 104 may be based on an Advanced Intelligent Network (AIN). Communication System 104 associates the communication between consumer 106 and the selected merchants with the online search performed by consumer 106. In particular, Communication System 104 uses the search association identifier for performing the association using one or more data logics and computer applications. The functioning of Communication System 104 is further explained in conjunction with FIG. 2 and FIG. 3.

When an association is established between consumer 106 and the selected merchants within a predefined time period of the online search, the selected merchants are charged a fee based on predefined billing criteria for connecting the consumer to the merchants. The predefined billing criteria are further explained in conjunction with FIG. 3.

In accordance with one of more embodiments of the invention, the search service provider may provide one or more loyalty programs to the consumer 106. Loyalty programs may include providing redeemable reward points to the consumer 106 when an association is established between consumer 106 and the selected merchants. The rewards points may be provided based on, e.g., number and frequency of communications between consumers and merchants, business categories of the merchants, subscription type of the merchants, and the like. Further, the loyalty program may include providing sweepstakes tokens to consumer 106 and performing regular lottery draws to reward consumers subscribed to the loyalty programs. It may be evident to a person skilled in the art that the loyalty programs may also include other incentives to reward the consumers using system 100 for communicating with one or more merchants.

In accordance with one of more embodiments of the invention, Search System 102 interacts with a plurality of Communication Systems 104. For example, the data on the merchants and the search data may be exchanged with more than one telecom service providers.

Figure 2:
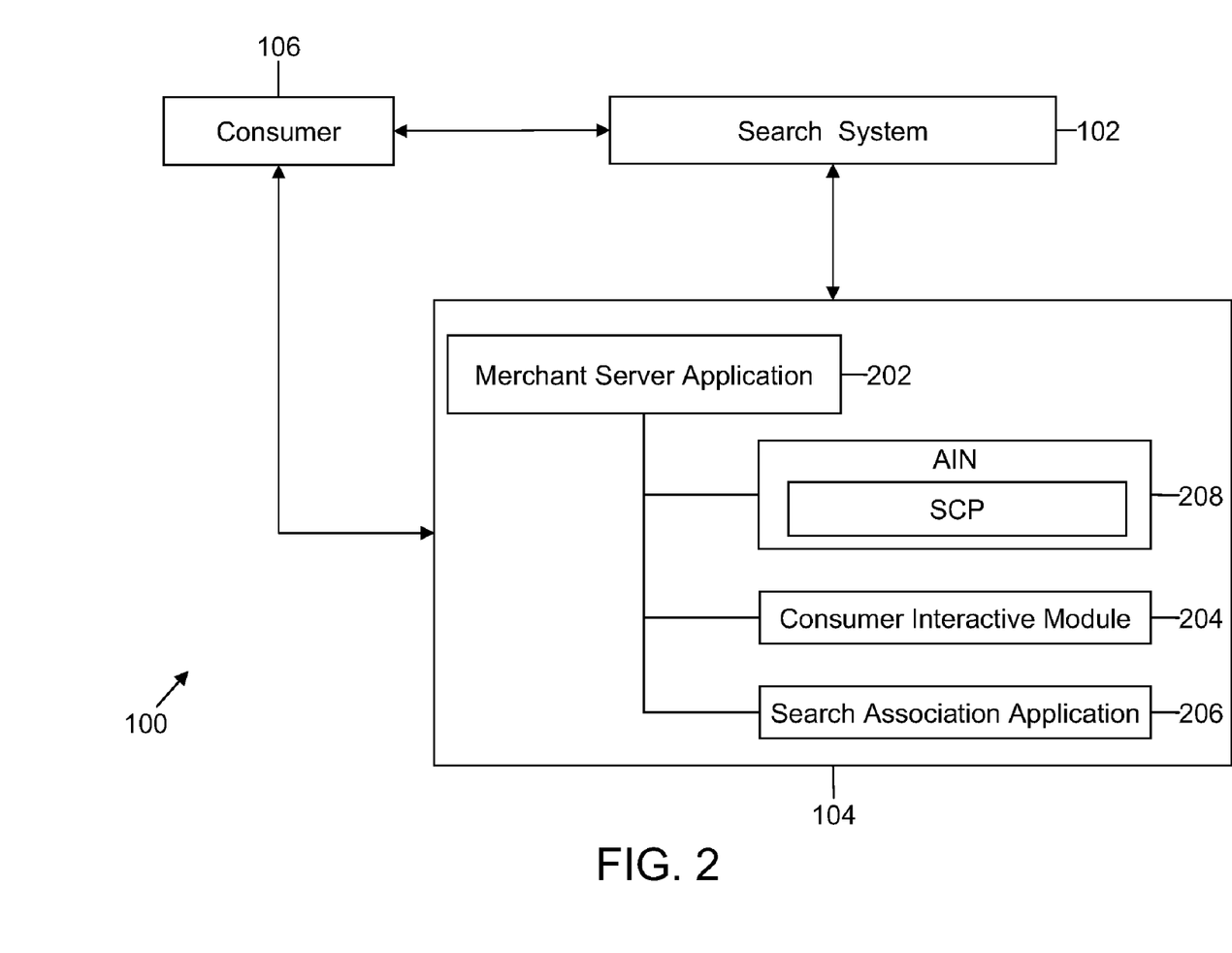
FIG. 2 is a block diagram of system for providing search marketing services such as pay-per-call services in accordance with one or more embodiments of the invention.

FIG. 2 is a block diagram of system 100 for providing search marketing services such as pay-per-call services, in accordance with one of more embodiments of the invention. In particular, FIG. 2 illustrates in greater detail Communication System 104 for connecting consumers and merchants. In accordance with one of more embodiments of the invention, Communication System 104 may be implemented in a telecom service provider system. Communication System 104 can include a Merchant Server Application 202, a Consumer Interactive Module 204 and a Search Association Application 206. Communication System 104 further includes an Advanced Intelligent Network (AIN) 208, enabling communication between consumers and merchants.

Consumer 106 enters an online search query, including one or more search terms and preferably a geographical location of interest, for identifying one or more desired merchants using system 100. Search System 102 processes the search query and requests data on one or more merchants from Merchant Server Application 202. The data on the merchants includes at least one telephone number and geographical locations of each of the merchants. Further, the data on the merchants may include information such as business product/service lines of the merchants, subscription categories of the merchants, areas of coverage provided by the merchants, business hours of the merchants, and the like.

Merchant Server Application 202 includes a data storage system, e.g., a database, to store the data on the merchants. The data may be provided by the merchants while subscribing to, e.g., the existing telecommunications services, with the telecom service provider. Further, the data on the merchants may be retrieved from the existing databases such as white pages, yellow pages, telephone directory, paid databases such as InfoUSA, and the like. In accordance with one of more embodiments of the invention, Merchant Server Application 202 returns the data on the merchants to Search System 102 based on, e.g., the geographical location of the desired merchants, business lines of the desired merchants, and the like, entered by consumer 106. In accordance with one of more embodiments of the invention, Merchant Server Application 202 provides the data on the merchants available in the telecom service provider's databases to Search System 102 at periodic time intervals, e.g., daily. This data on the merchants may then be stored with one or more databases in Search System 102 for future reference.

Search System 102 compares the online search query with the data on the merchants and returns search results to consumer 106. The search results include a list of merchants identified using one or more data logics, at least one telephone number of each of the identified merchants, and a search association identifier. The search association identifier may be provided based on predefined parameters. The generation of the search association identifier is explained in further detail in conjunction with FIG. 3.

Search System 102 is connected to Merchant Server Application 202 and provides search data to Merchant Server Application 202 of Communication System 104. The search data includes the search results and the search association identifier provided to the consumer 106, and the timestamp of the online search, corresponding to each online search performed using Search System 102. In accordance with one or more embodiments of the invention, Merchant Server Application 202 may be a computer readable application and may be executed on a data processing device with a telecom service provider.

Merchant Server Application 202 is connected to and provides the search data received from Search System 102 to Search Association Application 206. AIN 208 manages the communication of each of the merchants in the search results provided to consumer 106. AIN 208 may execute one or more call processing logics on, e.g., the incoming telephone calls to the telephone numbers of the merchants in the search results.

When consumer 106 initiates an interaction with a selected merchant of the merchants in the search results, a Consumer Interactive Module such as Consumer Interactive Module 204 is used to collect the search association identifier from consumer 106. In accordance with one or more embodiments of the invention, Consumer Interactive Module 204 may be integrated in AIN 208 and interacts with the Service Control Point (SCP) of AIN 208. The incoming telephone calls to the telephone numbers of the merchants in the search results may be routed through Consumer Interactive Module 204. In accordance with one or more embodiments of the invention, Consumer Interactive Module 204 may be an Interactive Voice Response (IVR) system. The IVR system may prompt for an input from consumer 106 when the communication with any of the merchants in the search results is initiated. For example, the IVR system may be configured to prompt for an activation code from consumer 106 and may enable the communication accordingly.

In accordance with one of more embodiments of the invention, Consumer Interactive Module 204 may be a stand-alone system without any integration with AIN 208, and is used to collect an activation code from consumer 106 to associate the search association identifier.

Consumer Interactive Module 204 provides the search association identifier received from consumer 106 to Search Association Application 206. Search Association Application 206 is also connected to AIN 208 and interacts with the SCP of AIN 208. Search Association Application 206 compares the search association identifier with the search data provided by Merchant Server Application 202. In particular, Search Association Application 206 compares the search association identifier with the list of search association identifiers in the search data. Further, Search Association Application 206 analyses the search data for the list of merchants in the search results returned to consumer 106 and the time of online search. The telephone call is completed by the switch through the SCP and a communication is enabled between consumer 106 and the merchant receiving the telephone call. When an association is established between the telephone call and the online search conducted by consumer 106 within a predefined time of conducting the online search, the merchant is billed according to the predefined billing criteria. The process for associating the communication between consumer 106 and the merchant with the online search is explained in further detail in conjunction with FIG. 3.

In accordance with one or more embodiments of the invention, the information of consumer 106 and the corresponding search association identifier may be stored for future reference. The information of consumer 106 may include the calling details of consumer 106, e.g., the Automatic Number Identification of consumer 106. When consumer 106 initiates an interaction with the selected merchant at a later time, the IVR may retrieve the stored search association identifier for associating the telephone call with an online search. Further, the telecom service provider operating Communication System 104 may share the stored information such as ANI of consumer 106 and the corresponding search association identifier with other telecom service providers interacting with Search System 102. In accordance with one or more embodiments of the invention, the information may be encrypted for sharing between the telecom service providers.

In accordance with one or more embodiments of the invention, Communication System 104 may set an origination attempt trigger in an origination switch or a termination attempt trigger in a termination switch, for the telephone number associated with the merchants provided in the search results to consumer 106. The triggers may be set using the AIN of the telecom service provider. In particular, the origination triggers and the terminating triggers may be set using the telecom service provider's legacy order processing system. The origination attempt trigger is set for an existing toll-free telephone number associated with the merchants and a termination attempt trigger is set for a local telephone number associated with the merchants. In accordance with one or more embodiments of the invention, the origination switches and the termination switches may be selected from 5ESS switch, DMS-100 switch and the like.

In particular, when AIN 208 receives a communication initiation attempt from consumer 106, the SCP receives a message of either an origination attempt from the origination attempt trigger or termination attempt from termination attempt trigger. The service control point routes the message to Search Association Application 206 and processes the initiation attempt based on the result of the association.

In accordance with one or more embodiments of the invention, the Communication System 104 may also enable communication between the selected merchant and the consumer 106 when the consumer 106 is using an Instant Messenger application. This includes routing a telephone call from the IM application running at a client device operated by consumer 106 to a telephone number of the selected merchant. Examples of the IM application may include, but are not limited to Yahoo Messenger, Gtalk, Skype and Windows Messenger.

In accordance with one of more embodiments of the invention, the Communication System 104 may also enable a telephone call between a telephone number of the selected merchant and a callback number of the consumer 106.

In accordance with one of more embodiments of the invention, AIN 208 changes the Automatic Number Identification (ANI) of the telephone number of consumer 106 prior to routing the telephone call from consumer 106 to the selected merchant, when communication between consumer 106 and the merchant is associated with the online search performed by the consumer 106.

In accordance with one or more embodiments of the invention, the Communication System 104 may interact with more than one Search System 102 to provide the search marketing services.

Figure 3:
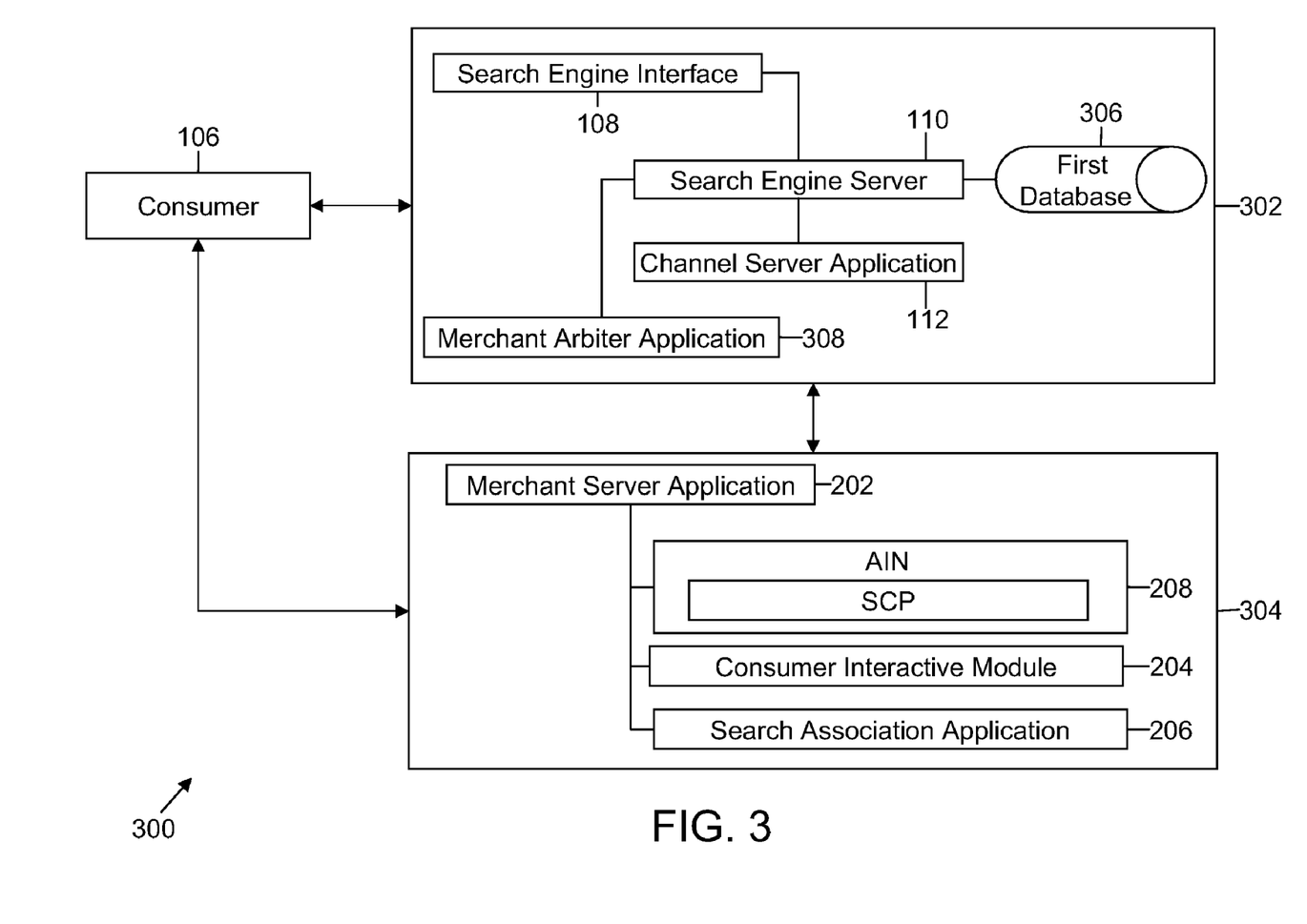
FIG. 3 is a block diagram of a system for providing search marketing services such as pay-per-call services in accordance with one or more embodiments of the invention.

FIG. 3 is a block diagram of a system 300 for providing search marketing services such as pay-per-call services, in accordance with one or more other embodiments of the invention. System 300 includes a Search System 302 for processing an online search query made by a consumer such as consumer 106 directed at identifying one or more desired merchants, and a Communication System 304 for connecting consumers and merchants. Search System 302 is similar in functioning and structure to Search System 102, and Communication System 304 is similar in functioning and structure to Communication System 104 described in conjunction with FIG. 1 and FIG. 2.

Communication System 304 includes a Search Engine Interface similar to Search Engine Interface 108, a Search Engine Server similar to Search Engine Server 110, a Channel Server Application similar to Channel Server Application 112, a first database 306 and a Merchant Arbiter Application 308. In accordance with one or more embodiments of the invention, the Search System 302 may be implemented in a search service provider system such as a search engine. Communication System 304 includes a Merchant Server Application similar to the Merchant Server Application 202, a Consumer Interactive Module similar to Consumer Interactive Module 204 and a Search Association Application such as Search Association Application 206. The Communication System 304 further includes an Advanced Intelligent Network (AIN) similar to AIN 208. Communication System 304 may be provided by a telecom service provider and includes at least one Service Control Point (SCP).

The Consumer 106 interacts with Search System 302 to perform an online search directed at identifying one or more desired merchants. In particular, consumer 106 provides a search query to Search System 302 using Search Engine Interface 108. The Search System 302 identifies one or more merchants and telephone numbers associated with the merchants based on first predefined criteria and provides search results to consumer 106. Search System 302 also associates a Search Association identifier with consumer 106.

The Search System 302 provides search data including the telephone numbers associated with the merchants, the search association identifier associated with consumer 106 provided in the search results, and a timestamp of the online search to Communication System 304. In accordance with one or more embodiments of the invention, Search System 302 provides search data for each online search conducted using Search System 302. Communication System 304 facilitates the communication between consumer 106 and a selected merchant of the merchants in search results. Further, Communication System 304 associates the communication between consumer 106 and the selected merchant with the online search performed by consumer 106. The selected merchant may then be charged a fee based on predefined billing criteria.

In accordance with one or more embodiments of the invention, the Search Engine Server 110 processes the search query from consumer 106 and identifies the merchants to be provided in the search results. The Search Engine Server 110 receives data on a plurality of merchants from the Channel Server Application 112 and performs a matching to identify the merchants to be provided in the search results. The Channel Server Application 112 receives the data on the merchants from the Communication System 104. The Channel Server Application 112 may include a processor to process the data on the merchants before providing the data on the merchants to the Search Engine Server 110. The processing may be performed based on, e.g., the geographical location specified by consumer 106 during the online search.

Alternatively, the Search Engine Server 110 may receive data on one or more merchants from first database 306. In accordance with one or more embodiments of the invention, first database 306 may receive data on the merchants directly from the merchants subscribing with the search service provider. In accordance with another embodiment of the invention, first database 306 may include existing sources of data on the merchants. Examples of first database 306 may include white pages, yellow pages, paid databases such as InfoUSA database, search service provider's existing databases, and the like.

In accordance with one or more other embodiments of the invention, the Search Engine Server 110 receives data on the merchants from both Communication System 104 and first database 306. In this case, the Search Engine Server 110 may include one or more data logics to prioritize the merchants identified and generate a list of merchants to be returned to consumer 106. For example, the search results may include separated lists for the merchants identified from Communication System 104 and first database 306. In particular, the search results may be presented to consumer 106 based on the subscription categories of the merchants registered with Communication System 304 and first database 306.

In accordance with one of more embodiments of the invention, Search Engine Server 110 provides the search query to the Channel Server Application 112. The Channel Server Application 112 performs the matching of the search query with the data on the merchants received from the Merchant Server Application 202 and identifies a first list of merchants matching the search results. Further, the Search Engine Server 110 may also identify a second list of merchants from first database 306. The first list and the second list may then be combined and prioritized by the Search Engine Server 110 before being presented in the search results, to consumer 106.

In accordance with one or more embodiments of the invention, the Channel Server Application 112 stores the data on the merchants received from the Merchant Server Application 202 in an "SE PPCall Merchants" table. The data may include the merchant name, Dialed Number Identification Service (DNIS) concatenated with the 2-digits of the TELCO System ID, a flag to indicate service addition or deletion, categories of business of the merchants, default Categories of business of the merchants, address, city, state, and zip code of the merchants, the business hours of the merchants, one or more search terms specified by the merchants, type of Service Coverage of each of the merchants, and the like. Examples of the type of Service Coverage may include, but are not limited to Local-level, Zip Code level, City-level, State-level, and National-level service coverage.

In accordance with one or more embodiments of the invention, the first predefined criteria include at least one of extent of overlap of the data on the merchants with the online search query. In particular, the keywords provided in the search query may be matched with the search terms specified in the data on the merchants. The first predefined criteria may further include the geographical location of the merchants and the geographical location provided by consumer 106, business hours of the merchants, subscription categories of the merchants, areas of service coverage provided by the merchants and type of online search performed by consumer 106.

In accordance with one or more embodiments of the invention, Search Engine Server 110 also provides the search results to Channel Server Application 112. Channel Server Application 112 assigns the search association identifier to the consumer 106 and associates the search association identifier with consumer 106 using identification information of the consumer 106. Further, the identification information may include, e.g., a user login provided by consumer 106, an email address provided by consumer 106, the name and address details of consumer 106, cookie data stored on the client device operated by consumer 106 during the last conducted online search using the Search System 302, and the like. Channel Server Application 112 may store the identification information of consumer 106 and the associated search association identifier in a database. In particular, each consumer such as consumer 106 may be assigned one search association identifier.

The search association identifier may be generated based on predefined algorithms. For example, the search association identifier may include an eight digit number. The last two digits of the eight digit number may include an identification of the search service provider. The first six digits can, e.g., be random digits generated by using a computer executable application.

In accordance with one or more embodiments of the invention, consumer 106 may be required to provide identification information to the Search System 302 to perform the online search. The identification information may include, e.g., a login ID of consumer 106 with the search service provider, an email address, name and address details, and the like. On receiving the identification information of consumer 106, the Channel Server Application 112 matches the identification information with the stored information in the database. When a match is established, the Channel Server Application 112 retrieves the stored search association identifier associated with the identification information of consumer 106. When a match is not established, a new search association identifier is generated for consumer 106 and stored along with the identification information of consumer 106 in the database. In accordance with one or more embodiments of the invention, consumer 106 may perform the online search anonymously and a new search association identifier is provided to consumer 106.

Alternatively, a new search association identifier may be provided to consumer 106 each time an online search is performed.

The Channel Server Application 112 provides search data including the Search Association Identifier, the one or more telephone numbers associated with the one or more merchants in the search results provided to consumer 106, and the timestamp of the online search to Merchant Server Application 202. Further, Merchant Server Application 202 may store the search data provided by Channel Server Application 112. In particular, Merchant Server Application 202 may store the search data in a "Channel Partner Merchants" table. Merchant Server Application 202 can delete the search data from "Channel Partner Merchant" table after a fixed interval of time.

The Merchant Server Application 202 interacts with AIN 208 and provides the search data to the SCP of AIN 208. Consumer Interactive Module 204 is used to receive a Search Association Identifier from consumer 106 when the consumer 106 initiates a communication with the merchants in the search results provided to consumer 106. Consumer Interactive Module 204 may provide consumer 106 with an option to opt-in a loyalty program, an option to opt-out of a loyalty program, option to skip voice announcements for a pre-defined amount of time, and the like.

In accordance with one or more embodiments of the invention, the predefined billing criteria may include billing based on subscription categories of the selected merchant, business product/service lines of the selected merchant, and the like. For example, Communication System 304 may charge a fee to the selected merchant for the lead calls identified by Search Association Application 206. A lead call is a unique communication between the consumer 106 and the selected merchant within a fixed interval of time. The time interval may depend on, e.g., the subscription categories of the merchant. For example, a merchant with a permanent subscription may be charged for only one communication with consumer 106 within 30 days of conducting the online search and a merchant with an on-the-go subscription may be charged for only one communication in 72 hours of conducting the online search. Communication System 304 may store the information regarding the successful search associations for each merchant and provide an itemized bill to the merchant, e.g., along with the regular telephone bill.

In accordance with one or more embodiments of the invention, the Search System 302 assigns loyalty points to, e.g., the email address associated with consumer 106 when a communication between consumer 106 and the selected merchant is associated with the online search performed by consumer 106. The Search System 302 may further notify consumer 106 of redemption opportunities for loyalty points assigned to consumer 106. In accordance with one or more embodiments of the invention, the Search System 302 may assign sweepstakes tokens to the email address associated with consumer 106. The sweepstakes tokens may enable consumer 106 to enter, e.g., drawings for prizes.

In accordance with one or more embodiments of the invention, the Communication System 304 may add a new merchant to the existing data on the merchants, using a merchant addition interface. In particular, the merchant addition interface may interact with the Merchant Server Application 202 to update details on the new merchants to a database in Merchant Server Application 202. An example of merchant addition interface may include a B2B interfaces for Self-serve Ad Creation Platform. Merchant Server Application 202 further sets up AIN triggers for one or more telephone numbers associated with the new merchant.

In accordance with one or more embodiments of the invention, Search System 302 may also add a new merchant using a merchant addition interface. The merchant addition interface interacts with Search System 302 to update data on the new merchant and one or more telephone numbers associated with the new merchant in a database such as the database in Channel Server Application 112, first database 306, and the like. Merchant Arbiter Application 308 enables invoking of a web service call from the Search Engine Server 110. In particular, Merchant Arbiter Application 308 interacts with Merchant Server Application 202 to verify the data on the new merchant and subsequently sets up triggers for the new merchant. Merchant Server Application 202 may further setup AIN triggers for the telephone numbers associated with the new merchant on receiving the data on the merchant from Search System 302.

Figure 4:
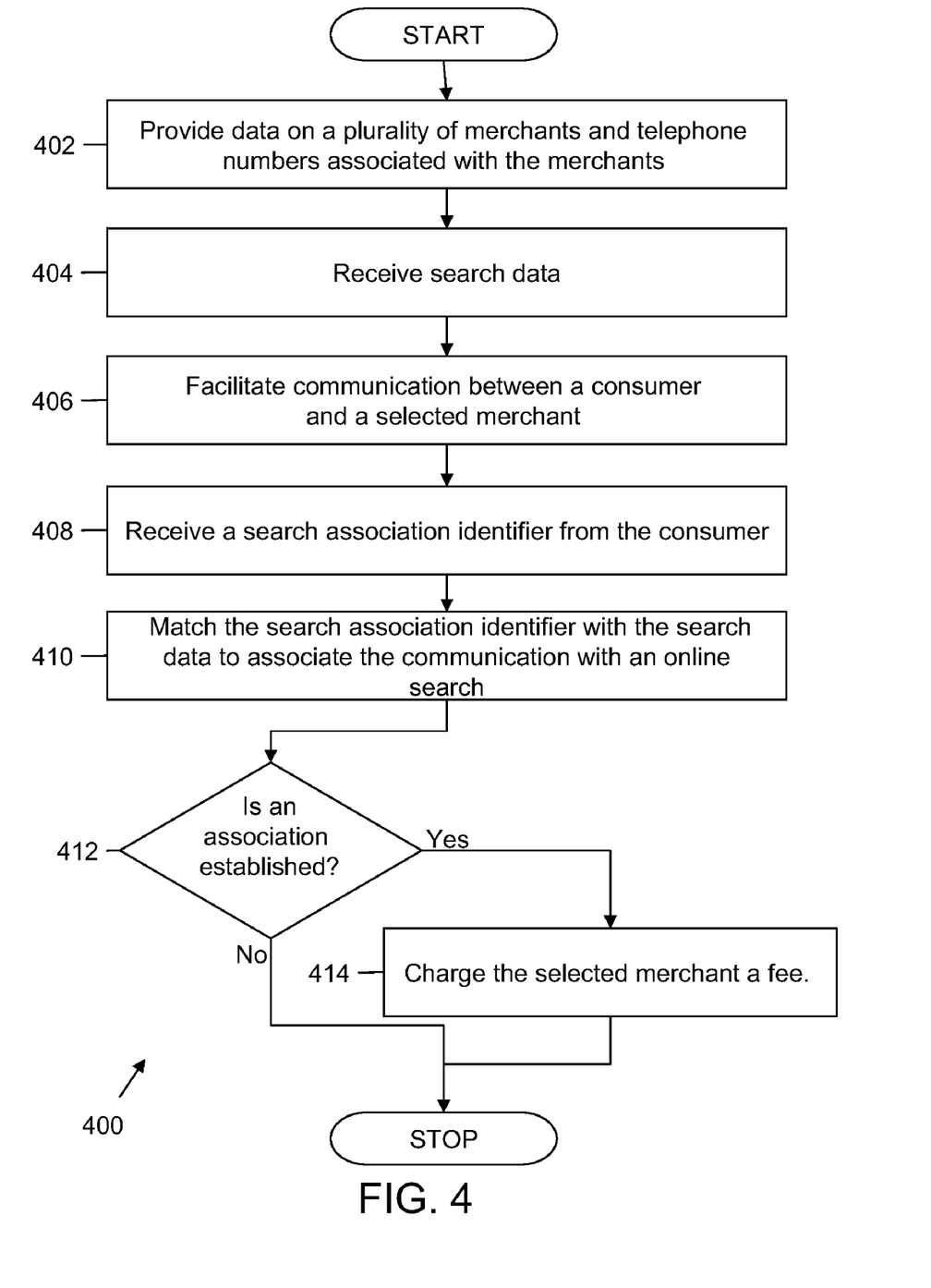
FIG. 4 is a flowchart illustrating a method for connecting consumers and merchants in accordance with one or more embodiments of the invention.

FIG. 4 is a flowchart illustrating a method 400 for connecting consumers and merchants in accordance with one or more embodiments of the invention. The method 400 may be executed by a telecom service provider, using a system such as Communication System 104 explained in conjunction with FIG. 2 and FIG. 3. At step 402, data on a plurality of merchants, one or more telephone numbers associated with the merchants, and the geographical location of the merchants is provided. In particular, the data on the merchants may be collected from, e.g., direct subscription of the merchants with the telecom service provider, telecom service provider's internal databases, white pages, yellow pages, search service providers internal database, direct subscription of the merchants with the search service provider, and the like. In accordance with one or more embodiments of the invention, the data on the merchants may be updated regularly or periodically by, e.g., adding new merchants and updating the data on the existing merchants. Further, the telephone numbers may include the pre-existing telephone numbers of the merchants.

At step 404, search data is received from a search service provider interacting with a consumer performing an online search directed at identifying one or more desired merchants. The search data may include a list of merchants and telephone numbers associated with the merchants. The search data further includes a search association identifier associated with the consumer performing the online search. The search data is generated by applications executed by the search service provider based on the search query and the geographical location of the desired merchants entered by the consumers.

At step 406, a communication between a consumer and a selected merchant of the plurality of merchants is facilitated using an Advanced Intelligent Network (AIN) such as AIN 208. The facilitating may include enabling, e.g., a telephone call between the consumer and the selected merchant. In facilitating the communication, a search association identifier is received from the consumer at step 408. The search association identifier may be received using, e.g., a Consumer Interactive Module such as Consumer Interactive Module 204. At step 410, the search association identifier received from the consumer is matched with the search data received from the search service provider. In accordance with one or more embodiments of the invention, the association may be established using one or more computer applications, such as Search Association Application 206, interacting with the SCP of the AIN. At step 412, a check is performed to determine whether a match has been established. The consumer is then connected to the selected merchant by completing the telephone call. (Alternately, the matching of the search association identifier in the search data is performed after the telephone call has been placed.) At step 414, when a match is established, the selected merchant is charged a fee based on predefined billing criteria explained in further detail in conjunction with FIG. 3. In accordance with one or more embodiments of the invention, when a match is established at step 414, Automatic Number Identification (ANI) of the consumer is changed prior to connecting the consumer to the merchant.

Figure 5:
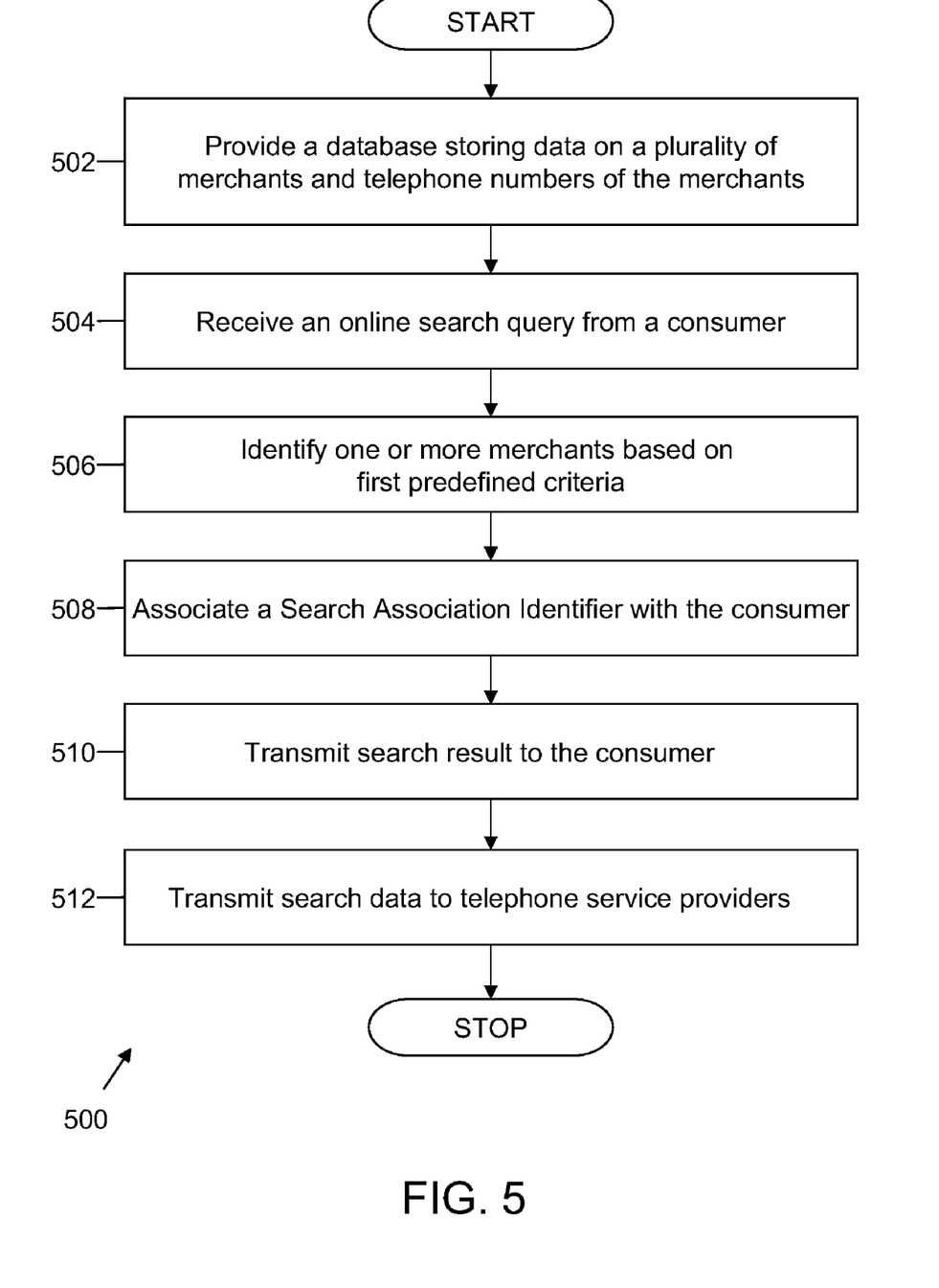
FIG. 5 is a flowchart illustrating a method for processing an online search query in accordance with one or more embodiments of the invention.

FIG. 5 is a flowchart illustrating a method 500 for processing an online search query, in accordance with one or more embodiments of the invention. The method 500 may be executed, e.g., by a search service provider, using a system such as Search System 102. At step 502, a database storing data on a plurality of merchants and one or more telephone numbers of the merchants is provided. The data on the merchants and telephone numbers of the merchants may be collected from one or more telecom service providers, yellow pages, white pages, search service providers internal database, merchants subscribing with the search service provider, and the like. At step 504, a search query directed towards identifying one or more desired merchants, is received from a consumer. The search query may be received using one or more search interfaces such as Search Engine Interface 108 and may include one or more search keywords, geographical location of the desired merchants, geographical location provided by the consumer, and the like.

At step 506, one or more merchants are identified from the data on the merchants provided in step 502. The identification is performed by matching the search query with the data on the merchants based on the first predefined criteria explained in further detail in conjunction with FIG. 1. In accordance with one or more embodiments of the invention, the identification may be performed using a Channel Server Application such as the Channel Server Application 112. In accordance with one or more embodiments of the invention, the identification may alternately be performed using a Search Engine Server such as Search Engine Server 110. In accordance with one or more embodiments of the invention, one or more merchants are identified using a database such as, e.g., white pages, yellow pages, search service provider's existing databases, paid databases such as the InfoUSA database, and the like.

At step 508, a search association identifier is associated with the consumer performing the online search. In accordance with one or more embodiments of the invention, the Channel Server Application may provide the search association identifier. In accordance with one or more embodiments of the invention, a new search association identifier may be generated for the consumer. The search association identifier thus associated with the consumer is stored for future reference along with a user identification of the consumer. The user identification may include, e.g., a login ID of the consumer, the name and address details of the consumer, an email address of the consumer, cookie data on the client device being operated by the consumer to perform the online search, and the like. Alternatively, a stored search association identifier associated with the consumer, e.g., during an earlier online search performed by the consumer, may be retrieved by the Channel Server Application.

At step 510, the search results are transmitted to the consumer. The search results may include data on the merchants and telephone numbers of the merchants identified in step 506, and the search association identifier associated with the consumer. The search results may be transmitted to the consumer using a Search Engine Interface such as Search Engine Interface 108. In accordance with one or more embodiments of the invention, step 510 may also include prioritizing the merchants in search results for display to the consumer. The prioritization may be performed based on, e.g., subscription categories of the merchants, geographical proximity of the merchants, business products/service lines of the merchants, and the like. At step 512, the search data is transmitted to one or more telecom service providers. The search data may include the search results, the search association identifier associated with the consumer, and a timestamp of the online search. The search data may be transmitted after every online search conducted using method 500. In accordance with one of more embodiments of the invention, the search data of all the online searches in a predefined time interval may be transmitted to the telecom service providers collectively.

The telecom service provider uses the search data received from the search service provider to associate the communication between the consumer and a merchant of the search results provided to the consumer with the online search. The association may be performed using a Search Association Application such as Search Association Application 112 interacting with the SCP of the AIN through which, the communication is being facilitated. When an association is established, the selected merchant may be charged a fee based on the predefined billing criteria explained in further detail in conjunction with FIG. 3. The telecom service providers may then store the search data for a predefined time interval.

One example of the use of the aforementioned systems and methods is as follows. A consumer performs an online search directed at identifying, e.g., one or more pizza restaurants using the website of a search service provider implementing the system. The consumer may perform the search using a Search Engine Interface, which may include, e.g., the local search engine website, the search engine's main search interface, and the like. The search query includes one or more keywords providing the details of business lines of the desired merchants. An example of the keywords for identifying the pizza restaurants may include the word "pizza." Further, the consumer can provide the desired geographical location of the pizza restaurants in the Search Engine Interface. Alternatively, the consumer may provide his zip code or other location identifier to identify the pizza restaurants located geographically close to his location. An exemplary search query may include "pizza" and "02458."

Based on the Search Engine Interface selected by the consumer, the consumer may be required to provide his identification information such as a Login ID, name, email address, and the like, for identification purposes. Alternatively, the consumer may be allowed to perform the online search anonymously.

The search query is directed to a Search Engine Server for processing, from the Search Engine Interface. The Search Engine Server receives the search query and the geographical location entered by the consumer and retrieves data on the plurality of merchants associated to a telecom service provider. The data on the merchants may be retrieved from a Channel Server Application interacting with a Merchant Server Application of the telecom service provider. The data on the merchants may also be retrieved from, e.g., InfoUSA database. The search query entered by the consumer is then matched with the data on the merchants based the search query and the geographical location entered by the consumer to identify the Pizza restaurants sufficiently close to the consumer.

The Search Engine Server then prepares search results to be displayed to the consumer. The search results can include a prioritized list of pizza restaurants along with the telephone numbers of the pizza restaurants. Further, the Channel Server Application provides a search association identifier associated with the consumer. The Channel Server Application may generate a new search association identifier or may retrieve an already stored search association identifier associated with the identification information of the consumer. The Search Association Identifier is provided to the consumer in the search results.

The search results provided to the consumer are also provided to one or more telecom service providers. When the consumer attempts to communicate with a selected merchant of the merchants in the search results through, e.g., a telephone call, an interactive voice response is used to provide an option to the consumer to input the search association identifier of the consumer. The consumer may optionally select to skip the IVR and the telephone call is completed by the switch through the SCP.

When the consumer provides the search association identifier that matches with the search association identifiers received from the Channel Server Application, the SCP of the AIN of the telecom service providers enables charging the selected merchant for the communication based on predefined billing criteria. For example, the selected merchant is charged only if the time lapse between the association and the online search is less than 72 hours. Further, the selected merchant is charged only once for all the communications made in the 72 hours.

The IVR may also provide the consumer with an option of opting-in or opting-out of the loyalty program offered by the search engine. In case the consumer has opted-in for the loyalty program through the IVR, the consumer may be awarded redeemable loyalty points or sweepstakes tokens for each association established by the telecom service provider. The search association identifier of the consumer may be stored in a database accessible to the IVR so that when the consumer makes another call to a merchant using the AIN of the telecom service provider, no voice announcement is provided to the consumer. The consumer may also choose to avoid the IVR for a fixed period of time.

The systems and methods described herein are preferably implemented in a computer system including one or more computers. A representative computer can be, e.g., a general-purpose computer that is Intel Pentium®, PowerPC® or RISC based, and includes an operating system such as Windows®, Unix or the like. As is well known, such machines include a display interface (a graphical user interface or "GUI") and associated input devices (e.g., a keyboard or mouse).

The methods described herein are preferably implemented in software, and accordingly one of the preferred implementations of the invention is as a set of instructions (program code) in a code module resident in the random access memory of a computer. Until required by the computer, the set of instructions may be stored in another computer memory, e.g., in a hard disk drive, or in a removable memory such as an optical disk (for eventual use in a CD ROM) or floppy disk (for eventual use in a floppy disk drive), or downloaded via the Internet or some other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the specified method steps.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

The invention claimed is:

1. A method of connecting consumers and merchants, comprising the steps of:
   (a) providing data on a plurality of merchants and one or more telephone numbers associated with each of the plurality of merchants;
   (b) receiving from a search system search data relating to an online search performed by a consumer directed at identifying a desired merchant, the search data identifying one or more merchants of the plurality of merchants matching the online search and a search association identifier associated with the consumer;
   (c) receiving the search association identifier from the consumer and facilitating communication between the consumer and a selected merchant of the one or more merchants;
   (d) associating the communication between the consumer and the selected merchant to the online search by matching the search association identifier received from the consumer and the search association identifier of the search data; and
   (e) charging the selected merchant a fee for connecting the consumer to the selected merchant when the communication between the consumer and the selected merchant is associated with the online search and the communication occurs within a predetermined period of time after the online search is performed by the consumer.

2. The method of claim 1 wherein the one or more telephone numbers associated with each of the plurality of merchants comprise pre-existing telephone numbers of each of the plurality of merchants.

3. The method of claim 1 wherein the search data further comprises Dialed Number Identification Service (DNIS) numbers of the one or more merchants and information on the time of the online search.

4. The method of claim 1 wherein the data on the plurality of merchants comprises for each merchant at least one of one or more search terms provided by the merchant, geographical location information of the merchant, subscription categories of the merchant, service coverage areas of the merchant, business hours of the merchant, and business categories of the merchant.

5. The method of claim 1 wherein step (c) comprises routing a telephone call made by the consumer to a telephone number associated with the selected merchant, the telephone number associated with the selected merchant having either an origination attempt trigger or a termination attempt trigger set using an Advanced Intelligent Network (AIN) architecture.

6. The method of claim 5 wherein the origination attempt trigger is set for a toll-free telephone number associated with the selected merchant and the termination attempt trigger is set for a local telephone number associated with the selected merchant.

7. The method of claim 1 wherein step (c) comprises routing a telephone call from the consumer using an Instant Messenger application running on a device operated by the consumer to a telephone number associated with the selected merchant using an Advanced Intelligent Network (AIN) architecture.

8. The method of claim 1 wherein step (c) comprises routing a telephone call between a telephone number associated with the selected merchant and a call back number of the consumer using an Advanced intelligent Network (AIN) architecture.

9. The method of claim 1 wherein steps c is performed using an Advanced Intelligent Network (AIN) architecture and stepped d is performed using a Search Association Application interacting with the Service Control Point (SCP) of the Advanced Intelligent Network (AIN) architecture.

10. The method of claim 1 wherein the selected merchant is charged a fee for only one communication between the consumer and the selected merchant within a predefined time period.

11. The method of claim 1 further comprising the step of awarding one or more loyalty points to the consumer when the communication between the consumer and the selected merchant is associated with the online search performed by the consumer.

12. A method of processing an online search query made by a consumer directed at identifying a desired merchant, comprising the steps of:
(a) storing data on a plurality of merchants and one or more telephone numbers associated with each of the plurality of merchants;
(b) receiving an online search query from a consumer, the online search query comprising one or more keywords directed at identifying one or more desired merchants;
(c) identifying one or more merchants of the plurality of merchants matching the one or more keywords;
(d) assigning a search association identifier with the online search query;
(e) transmitting search results and the search association identifier to the consumer, the search results comprising an identification of the one or more merchants of the plurality of merchants and one or more existing telephone numbers associated with each of the one or more merchants; and
(f) transmitting search data to one or more telecom service providers, the search data comprising the search results, the search association identifier of the online search query, and a timestamp of the online search;
wherein when a communication is made between the consumer and a selected merchant identified in the search results, the communication is associated with the online search query by one of the one or more telecom service providers using the search association identifier within a given period of time after the search result is transmitted to the consumer, such that the selected merchant can be charged a fee for connecting the consumer to the selected merchant.

13. The method of claim 12, further comprising storing data on a plurality of consumers uniquely identifying each of the plurality of consumers.

14. The method of claim 13 wherein step (d) further comprises uniquely identifying the consumer from the plurality of consumers using at least one of a login ID and an email addresses of the consumer.

15. The method of claim 12 wherein the one or more telephone numbers comprise the pre-existing telephone numbers associated with each of the plurality of merchants.

16. The method of claim 12 wherein the data on the plurality of merchants comprises for each merchant at least one of one or more search terms provided by the merchant, geographical location information of the merchant, subscription categories of the merchant, service coverage areas of the merchant, business hours of the merchant, and business categories of the merchant.

17. The method of claim 12 wherein the online search query identifies a geographical location of the consumer.

18. The method of claim 12 wherein step (c) comprises identifying one or more merchants based on at least one of closeness of the data on a merchant with the online search query, distance between the geographical location of a merchant and a geographical location of the consumer, business hours of a merchant, subscription categories of a merchant, and areas of service coverage provided by a merchant 19. The method of claim 12 further comprising assigning one or more loyalty points to the consumer when the communication between the consumer and the selected merchant is associated with the online search query received from the consumer.

20. The method of claim 12 further comprises prioritizing the one or more merchants in the search results such that the one or more merchants are displayed to the consumer in a particular order.

21. A system for connecting consumers and merchants using an Advanced Intelligent Network, comprising:
a merchant server application providing data on a plurality of merchants and one or more telephone numbers associated with each of the plurality of merchants, the merchant server application receiving from a search system search data relating to an online search performed by a consumer directed at identifying a desired merchant, the search data identifying one or more merchants of the plurality of merchants matching the online search and a search association identifier associated with the consumer;
a consumer interactive module interacting with a service control point (SCP) of the Advanced Intelligent Network, the consumer interactive module receiving the search association identifier from the consumer, the consumer interactive module providing the search association identifier to the SCP; and
a search association application interacting with the SCP for facilitating the communication between the consumer and a selected merchant of the one or more of the plurality of merchants, the search association application associating the communication between the consumer and the selected merchant to the online search by matching the search association identifier received from the consumer and the search association identifier of the search data, wherein the selected merchant charged a fee for connecting the consumer to the selected merchant when the communication between the consumer and the selected merchant is associated with the online search and the communication occurs within a predetermined period of time after the online search is performed by the consumer.

22. The system of claim 21 wherein the one or more telephone numbers comprise pre-existing telephone numbers associated with the plurality of merchants.

23. The system of claim 21 wherein the Advanced Intelligent Network routes a telephone call made by the consumer to a telephone number associated with the selected merchant, the telephone number associated with the selected merchant having either an origination attempt trigger or a termination attempt trigger set using the Advanced Intelligent Network architecture.

24. The system of claim 23 wherein the origination attempt trigger is set for a toll-free telephone number associated with the selected merchant and the termination attempt trigger is set for a local telephone number associated with the selected merchant.

25. The system of claim 21 wherein the Advanced Intelligent Network routes a telephone call from the consumer using an Instant Messenger application miming in a device operated by the consumer to a telephone number associated with the selected merchant using the Advanced Intelligent Network architecture.

26. The system of claim 21 wherein the Advanced Intelligent Network routes a telephone call between a telephone number associated with the selected merchant and a call back number of the consumer using the Advanced Intelligent Network architecture.

27. The system of claim 21 wherein the Consumer Interactive Module comprises an Interactive Voice Response (IVR) system.

28. A system for processing an online search query made by a consumer directed at identifying a desired merchant, comprising:

- a search engine interface communicating with a client device operated by the consumer, the search engine interface receiving the online search query from the consumer, the online search query including one or more keywords directed at identifying one or more desired merchants;
- a channel server application storing data on a plurality of merchants including one or more telephone numbers associated with each of the plurality of merchants, the channel server application receiving the data on a plurality of merchants from one or more telecom service providers; and
- a search engine server communicating with the channel server application, the search engine server identifying one or more desired merchants from the plurality of merchants matching the one or more keywords, the search engine server further providing search results including data on the one or more desired merchants and a search association identifier associated with the consumer to the consumer using the search engine interface;

wherein when a communication is made between the consumer and a selected merchant identified in the search results, the communication is associated with the online search query by one of the one or more telecom service providers within a given period of time after the search result is transmitted to the consumer, such that the selected merchant can be charged a fee for connecting the consumer to the selected merchant.

29. The system of claim 28 wherein the data on the plurality of merchants includes for each merchant at least one of one or more search terms, geographical location information, subscription categories, service coverage areas, business hours, and business categories.

30. The system of claim 28 further comprising a merchant arbiter application receiving data on a new merchant including one or more telephone numbers associated with the new merchant using a merchant addition interface.

* * * * *